United States Patent [19]

Dzibinski

[11] Patent Number: 5,511,466
[45] Date of Patent: Apr. 30, 1996

[54] COOKING UTENSIL

[76] Inventor: DuWayne M. Dzibinski, 11407 Rawson Ave., Franklin, Wis. 53132

[21] Appl. No.: 504,895
[22] Filed: Jul. 20, 1995
[51] Int. Cl.⁶ .............................. A47J 27/00; A47J 37/10
[52] U.S. Cl. ................................. 99/339; 99/422; 99/446; 99/448; 126/373; 126/385; 126/390; 220/912; D7/354; D7/357
[58] Field of Search ..................... 99/339, 340, 401, 99/422, 423, 425, 444–446, 447, 448, 467; 126/373, 390, 383, 385, 369, 369.2; 219/432, 459; 220/912, 753, 4.01; 426/523; D7/354, 357, 360

[56] References Cited

U.S. PATENT DOCUMENTS

| D. 173,387 | 11/1954 | Schnitzer . | |
|---|---|---|---|
| 2,622,591 | 12/1952 | Bramberry . | |
| 3,439,603 | 4/1969 | Reames . | |
| 3,808,963 | 5/1974 | Ludena | 99/339 |
| 4,418,829 | 12/1983 | Clay . | |
| 4,491,235 | 1/1985 | Fournier et al. | 126/390 |
| 4,528,975 | 7/1985 | Wang | 99/448 |
| 4,666,727 | 5/1987 | Wang | 426/523 |
| 4,873,921 | 10/1989 | Piane, Sr. | D7/354 |
| 5,129,314 | 7/1992 | Hu | 99/422 |
| 5,189,945 | 3/1993 | Hennick | 99/339 |
| 5,239,916 | 8/1993 | Hu | 99/422 |
| 5,241,900 | 9/1993 | Piane, Sr. | 99/339 |
| 5,345,062 | 9/1994 | Maudal | 219/432 |
| 5,365,833 | 11/1994 | Chen | 99/401 |
| 5,385,085 | 1/1995 | Piane, Sr. | 220/912 |

FOREIGN PATENT DOCUMENTS 39346  9/1928  Denmark .

Primary Examiner—Timothy F. Simone
Attorney, Agent, or Firm—Ryan, Maki, Mann & Hohenfeldt

[57] ABSTRACT

An annular trough is formed integrally with the rim of a bowl-like wok to provide a place to store and cook ingredients individually while one or more other ingredients are being cooked in the bowl. A cover used in combination with the wok is comprised of sheet metal formed as a truncated hemispherical configuration by metal spinning techniques. The cover mates with the wok in such manner that there is an annular passageway or gap that provides for convection of heat from the bowl of the wok to the trough for keeping ingredients stored therein warm or for cooking other ingredients that are stored in the trough. The cover covers the entire radial width of the trough.

6 Claims, 1 Drawing Sheet

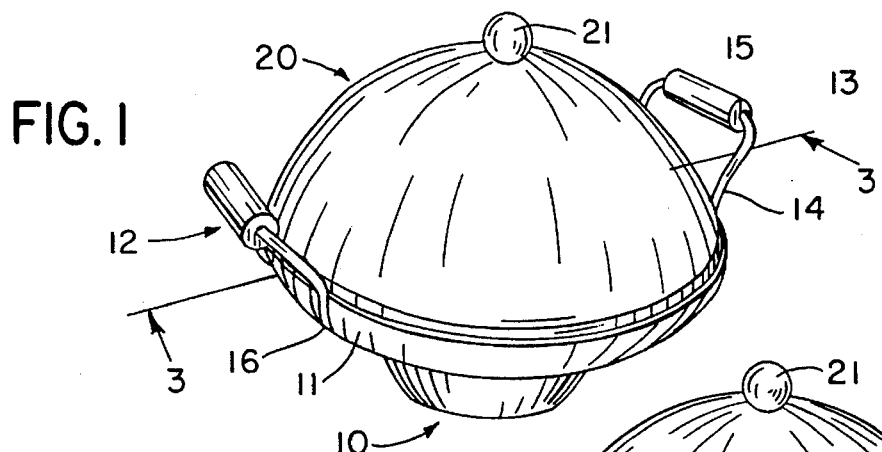
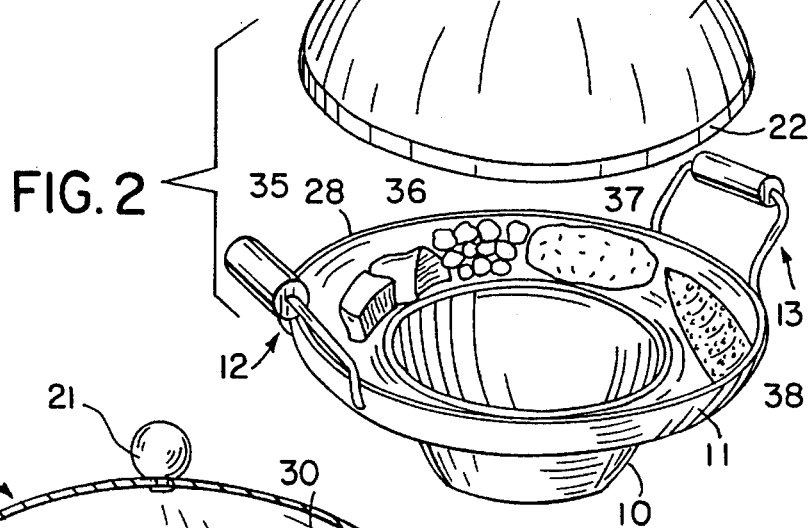
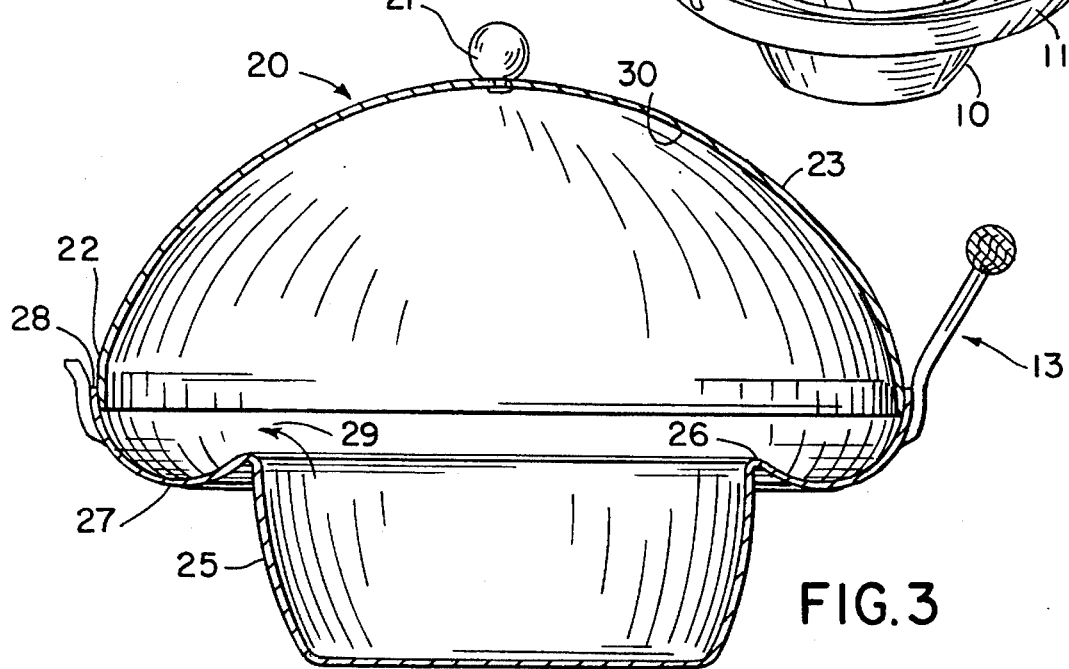

5,511,466

COOKING UTENSIL

BACKGROUND OF THE INVENTION

The invention disclosed herein pertains to improvements in a utensil commonly known as a wok.

Preparing a meal with a wok in a conventional manner involves placing the wok on a burner or heating element and usually pouring the least permissible amount of cooking oil or other fat into it. After the wok and oil come up to temperature, the ingredients constituting a recipe for a balanced meal are added to the wok and stirred together. The method is sometimes called stir-frying. The main course of a meal prepared in a wok may be composed of meat or fish plus one or more of carrots, celery, peas, green beans and/or other vegetables by way of example, and not limitation. An objective of cooking with a wok, besides minimizing the amount of fat on the food, is to obtain vegetables that are sufficiently tender to eat and yet are crisp and tasty and have not had the natural juices expressed from them by high temperature or long cooking time.

When cooking with a wok in the conventional manner foodstuffs composing a meal are often together long enough for them to lose their shape and unique individual taste so as to become an agglomeration similar to chop suey which is not desired. Hence, flavors of the ingredients exchange with each other such that all of the components of the meal may have the same taste. The ingredients also lose their unique texture so the mixture of vegetables and meat is less pleasing than it could have been.

It should be apparent, that it would be highly beneficial to a cook or chef if provision were made in a wok to offer the option of cooking several ingredients together in the bowl of the wok while isolating some ingredients that have been previously cooked or which are simply being pre-heated in readiness for being introduced in the mixture within the wok bowl or which provides setting aside ingredients within the wok while other ingredients stored in the wok are cooked in the bowl of the wok. It would also be beneficial if foodstuffs could be cooked in the utensil concurrently with but separate from the foodstuffs being cooked in the wok bowl.

SUMMARY OF THE INVENTION

An objective of the invention is to provide a wok and cover combination that has the capability of permitting cooking foodstuffs in sequence or in any combination concurrently and that provides for keeping foodstuffs inside of the wok under a cover, isolated from each other in readiness for being cooked individually within the wok or in the mixture of foodstuffs in the bowl of the wok.

Another objective of the invention is to accomplish the objective stated in the preceding paragraph by providing a wok that has the characteristics of the metal bowl of a conventional wok but in addition has an annular trough surrounding the rim of the bowl and a cooperating dome-like cover having a rim which provides for the cover fitting snugly within the rim of the trough and thereby covering entire trough. The cover serves to reflect heat derived from the wok bowl into the trough so that foodstuffs that one would like to cook separately from the mixture of ingredients in the bowl of the wok are isolated in the trough and may be cooked by secondary heat reflected from the cover and/or convected from the bowl.

In accordance with the invention, a metal bowl-like utensil has a flat bottom and a sidewall terminating in an upper annular rim that is continuous with the sidewall and is deflected reentrantly and downwardly and then curved upwardly to define an annular trough around the bowl that terminates in an upper rim having a certain inside diameter. The single piece bowl and trough functions in combination with a cover that is generally hemispherical but truncated at its diameter to define a dome which has a rim whose outside diameter is slightly smaller than the inside diameter of the rim of the trough so that the cover fits snugly into the rim of the trough and overhangs the entire radial width of the trough.

The bowl of the wok and the cover are preferably composed of aluminum sheets which are formed respectively by metal spinning techniques. The parts could be made of steel too.

It has been demonstrated that with the improved wok, individual foodstuffs or combination of foodstuffs can be cooked in the bowl of the wok and stored in the trough separately from each other. One alternative is to cook certain foodstuffs in the bowl of the wok and concurrently keep in the trough other foodstuffs which can thereby be cooked in isolation from each other by heat, particularly infrared radiation, that is reflected or radiated from the cover which cooperates with the bowl and trough of the wok or by heat convected from the bowl.

It has also been demonstrated that foodstuff components of a meal can be cooked entirely in the trough while other foodstuffs are being cooked in the bowl. When water is boiling in the bowl other foodstuffs can be cooked in the trough. For example, if rice or meat are being cooked in water in the wok bowl, vegetables such as corn, corn on the cob, beans, potatoes and others residing in the trough cook rapidly by convection of steam and radiation of heat derived from the bowl. The versatility of the new wok and dome-like cover combination is limited only by limitations on the creativity of the cook.

How the foregoing objectives and other more specific objectives of the invention are achieved will be evident in the ensuing more detailed description of the improved wok and cover combination which will now be set forth in reference to the drawings.

DESCRIPTION OF THE DRAWINGS

FIG. 1 is a perspective view of the improved cooking utensil comprised of the combination of a wok bowl having a trough and a particularly configured cover;

FIG. 2 is a perspective view of the wok and cover combination with the cover displaced so as to provide a view of the interior of the wok bowl and trough; and FIG. 3 is a vertical sectional view of the wok and cover combination taken on a line corresponding with 3—3 in FIG. 1.

DESCRIPTION OF A PREFERRED EMBODIMENT

The principal components of the wok and cover combination are identified in FIG. 1. The bowl of the wok is identified by the numeral 10. The continuous annular trough that is formed unitarily with the bowl is marked 11. The wok has handle assemblies 12 and 13. Typical handle assembly 13 comprises a metal rod formed into a U shaped configuration and is provided with a heat insulating grip 15. The ends of the rod are preferably welded as indicated by the numeral 16 to the outside diameter of the trough although the handles could be riveted or otherwise fastened to the trough. The cover or lid that cooperates with the unitary bowl and trough of the wok is designated generally by the numeral 20. The cover is preferably sheet aluminum operated on by metal spinning tools, not shown, to form the cover into a dome-like shape. By way of example and not limitation, the cover is close to being hemispherical but is a hemisphere truncated at its equator. The cover is provided with a non-metallic handle 21 for handling it when it is hot.

FIG. 2 shows that the cover 20 terminates in a rim 22 which is cylindrical and coaxial with the dome-like cover body although the curved part 23 could be a continuous curve all the way to the extremity of the rim of the cover. The cylindrical rim 22 is considered preferable.

Attention is now invited to FIG. 3 which shows in greater detail how the unitary bowl and trough of the wok are configured and also how the cover fits into the wok and overhangs the entire radial distance of the trough. Spun sheet metal bowl 10 which is desirably aluminum, has a flat bottom 24 and an annular radially outwardly diverging wall 25. The wall extends to an annular transition rim 26 at which the sheet metal is reentrantly bent downwardly to form a curved bottom 27 of a trough which terminates in an upwardly extending annular rim 28. The outside diameter of the rim 22 of the cooperating cover is just a little less than the inside diameter of the trough rim 28 so that when the cover is inserted in the trough, the rims of the trough and the cover fit snugly together. Because of the internal curvature of the trough, the extremity or edge of the rim 22 of the cover is stopped when it has penetrated the trough by a small distance. Thus, the entire radial width of the trough from the rim of the bowl 26 to the rim 28 of the trough is overhung by the margin of the dome-like cover 23. When the cover 23 is inserted into the trough as in FIG. 3, an annular gap 29 exists between the interior of the bowl 10 and the interior of the trough 11 so that when the bottom 24 of the bowl is heated and ingredients are cooking in the bowl, heat can transfer by convection from the bowl to the interior of trough 11. Moreover, heat is convected and radiated from the bowl 10 to the inside surface 30 of cover 20. This heat is reflected and radiated back by the interior surface 30 to the interior of trough 11 wherein food items can be cooked separately from items which are being cooked or stir-fried in the bowl 10.

It will be understood that the wok is designed for being heated by resting on an electrically energized hot plate or gas burner, not shown.

It will be evident in FIGS. 2 and 3 that when the cover is in place on the trough, vapor which condenses on the interior of the cover 20 flows down the inside of the interior and arrives in the trough.

FIG. 2 exemplifies having several foodstuffs residing in the trough 11 for being cooked or kept warm. For example, diced potatoes 35, meat 36, sliced carrots 37, and one or more cobs of corn 38 may be kept or fully cooked in the trough. It has been demonstrated that corn on the cob of common sizes can be cooked in the trough and, if it is desired to cook the corn in a microwave oven or boiling water while other things are being cooked in the trough, the corn, when done, can be placed in the trough to keep it hot so that all foodstuffs cooked in the wok bowl and in the trough can be heated to the desired temperature and served hot at the same time. Everything kept in the trough stays warm while other ingredients up to the last foodstuff constituting the meal has been cooked in the bowl and trough. Other stir-fried vegetables 39 are shown in the bowl.

For the purpose of fulfilling a perception of the dimensions and proportionality of the wok and cover combination, the dimensions of an actual embodiment of the utensil will be given with the understanding that the information is solely for illustration and is not to be construed as limiting the scope of the invention. The diameter of the flat circular bottom 24 of the bowl is about 6 inches (152 mm). The diameter across the inside rim 26 of the bowl, that is, at the reentrant bend is about 7 inches (178 mm). The height of the bowl from bottom 24 up to inside rim 26 is about 3 inches (76.2 mm). The inside diameter of the trough at the extremity of its rim is about 12 inches (305 mm). The width of the trough is about 2.5 inches (63 mm). The cover 20 is not a full hemisphere which would result from splitting a hollow sphere at its equator but is a truncated hemisphere comparable to splitting a hollow sphere at a latitude about or below the equator. The outside diameter of the rim of the cover is slightly less than about 12 inches (304 mm) so it fits inside of the rim 28 of the trough. The maximum height of the dome-like cover measured from the extremity of its rim 22 to its highest point where knob 21 is fastened is about 4.5 inches (114 mm).

I claim:

1. The combination of a cooking vessel and a cooperating cover, said vessel comprising:

a bowl-like body composed of sheet metal having a flat circular bottom and an annular wall extending nominally upwardly and unitarily from said bottom to terminate at an annular inner rim at which, without discontinuity, said sheet metal bends reentrantly downwardly and then is curved upwardly to define an annular trough circumjacent said body, said trough terminating in an upper circular rim having an inside diameter at the extremity thereof, said cover comprising:

a hollow dome-like member composed of sheet metal having inner and outer surfaces terminating in a circular rim having an outside diameter at the extremity thereof sufficiently less than said inside diameter of said circular rim of the trough for said outside diameter of said rim at said extremity of the cover to enter said inside diameter of said extremity of said rim of said trough such that said cover covers said bowl-like body and the entirety of the trough when the cover is applied to said vessel.

2. A vessel and cover combination according to claim 1 wherein a majority of the area of said cover has a near hemispherical shape and an annular region contiguous with said extremity of said rim of the cover is cylindrical and coaxial with said majority of said area of the cover.

3. A vessel and cover combination according to claim 1 wherein said bowl-like body and trough are composed of spun aluminum sheet.

4. A vessel and cover combination according to claim 1 wherein said cover is composed of spun aluminum sheet.

5. A vessel and cover combination according to claim 1 wherein said upper circular rim of said trough is more remote from said flat circular bottom than is said annular inner rim of said bowl-like body.

6. A vessel and cover combination according to claim 1 including a pair of handle members fastened, respectively, to said trough diametrically opposite of each other, and a non-metallic handle fastened to said cover coincident with the axis of said cover.

\* \* \* \* \*